Nov. 26, 1935.    W. L. MORRISON    2,022,087
DEFLECTOR FOR AUTOMOBILES
Filed Sept. 14, 1933    3 Sheets-Sheet 1

Inventor:
Willard L. Morrison,
By Parker & Carter
Attys.

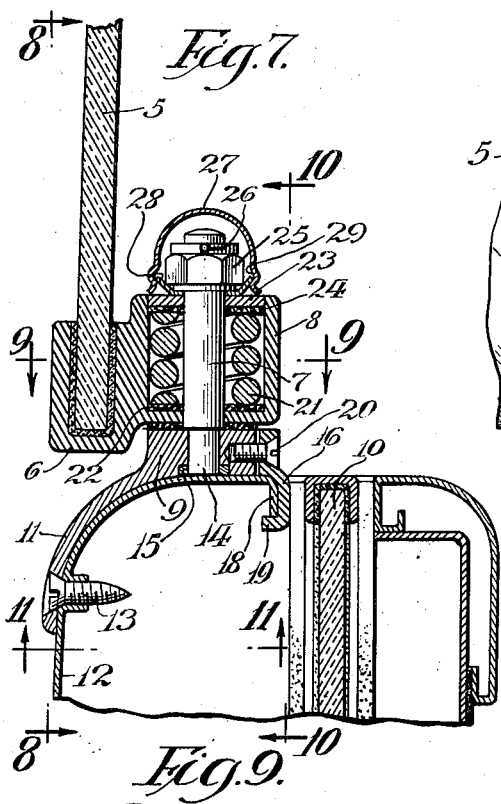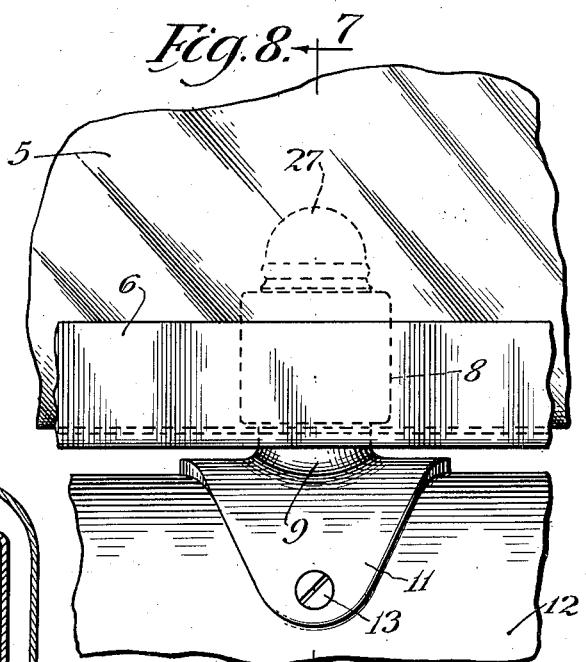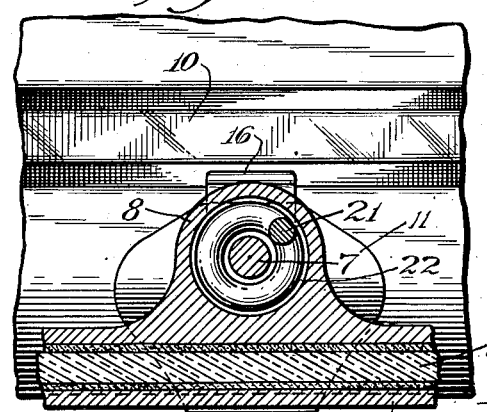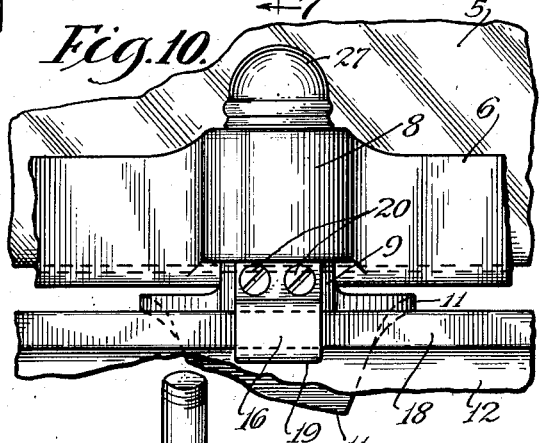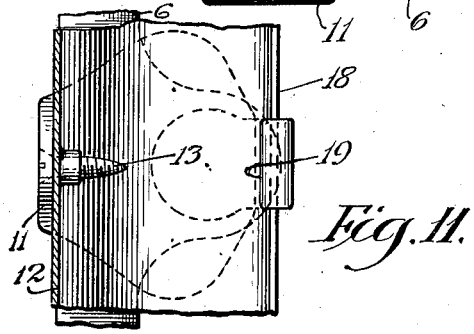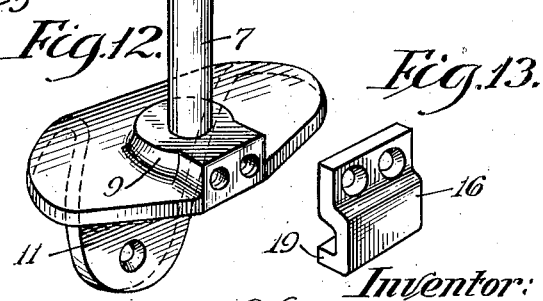

Nov. 26, 1935. W. L. MORRISON 2,022,087
DEFLECTOR FOR AUTOMOBILES
Filed Sept. 14, 1933    3 Sheets-Sheet 3
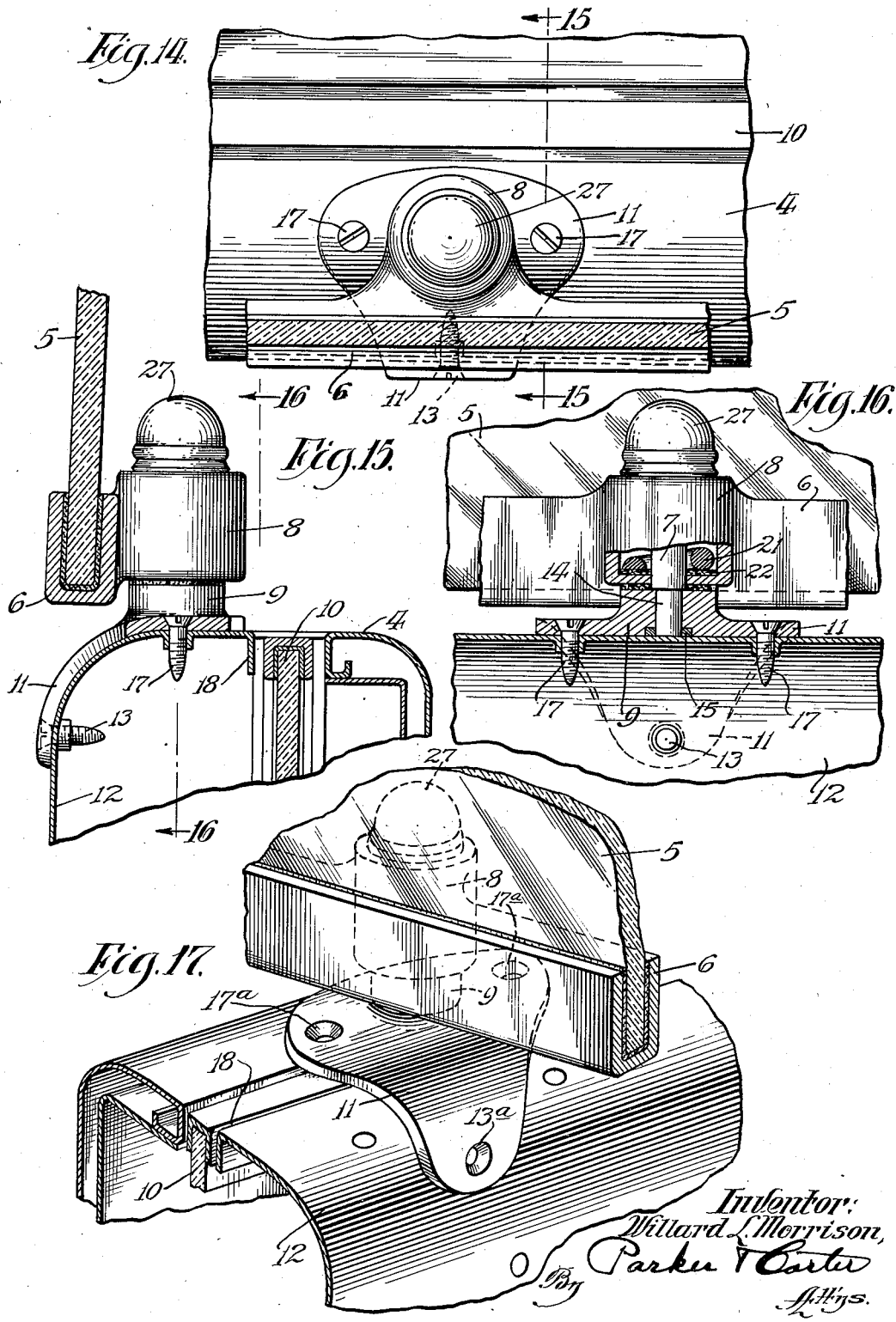

Patented Nov. 26, 1935

2,022,087

UNITED STATES PATENT OFFICE 2,022,087

DEFLECTOR FOR AUTOMOBILES

Willard L. Morrison, Chicago, Ill.

Application September 14, 1933, Serial No. 689,387

6 Claims. (Cl. 296—84)

This invention relates to deflectors for automobiles and has for its object to provide a new and improved device of this description. The invention has as a further object to provide a deflector particularly adapted for convertible automobiles. The invention has as a further object to provide a deflector having a single pivotal connection with the automobile. The invention has further objects which are more particularly pointed out in the accompanying description.

Referring now to the drawings, Fig. 1 is a view showing an automobile with a deflector embodying one form of the invention;

Fig. 7 is a sectional view taken on line 7—7 of Fig. 8;

Fig. 8 is a view of a portion of the lower part of the deflector as seen from the inside of the automobile;

Fig. 9 is a sectional view taken on line 9—9 of Fig. 7;

Fig. 10 is a sectional view taken on line 10—10 of Fig. 7;

Fig. 11 is a sectional view taken on line 11—11 of Fig. 7;

Fig. 12 is a perspective view of the pivot and supporting member;

Fig. 13 is a perspective view of the fastening member for the pivot support.

Fig. 14 is a view similar to Fig. 9 showing a modified construction;

Fig. 15 is a sectional view taken on line 15—15 of Fig. 14;

Fig. 16 is a sectional view taken on line 16—16 of Fig. 15;

Fig. 17 is a perspective view of the modified construction showing the supporting bracket and associated parts in position to be fastened to the reveal.

Like numerals refer to like parts throughout the several figures.

Figure 1:
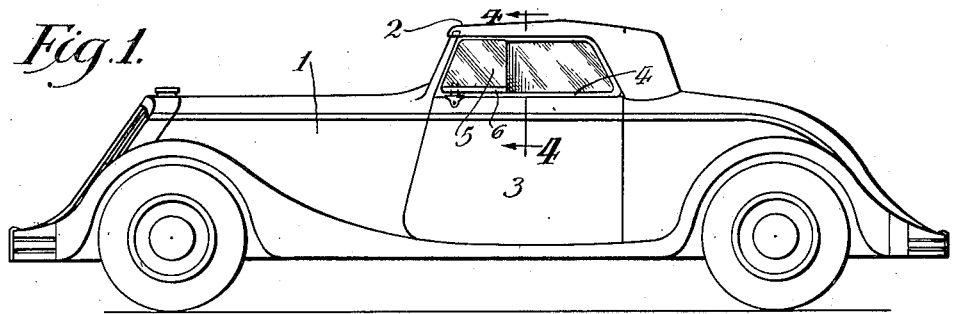
Figure 2:
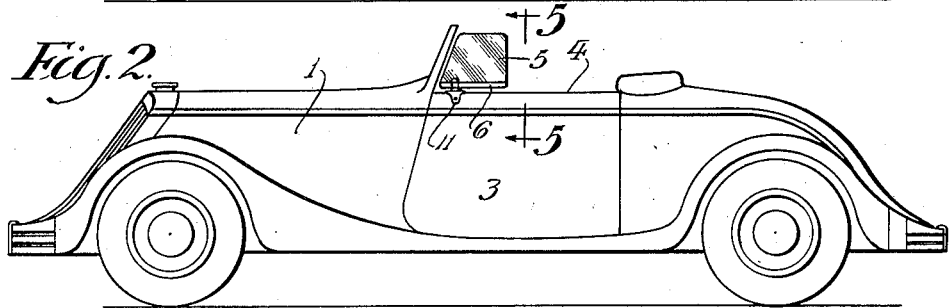
Fig. 2 is a view similar to Fig. 1 with the top down.
Figure 3:
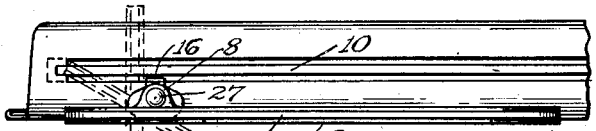
Fig. 3 is a view looking down on the top of the deflector.
Figure 4:
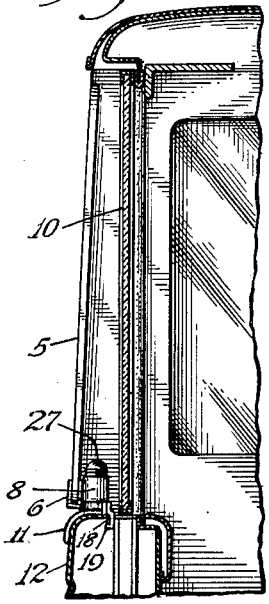
Fig. 4 is an enlarged sectional view taken on line 4—4 of Fig. 1 with parts omitted.
Figure 5:
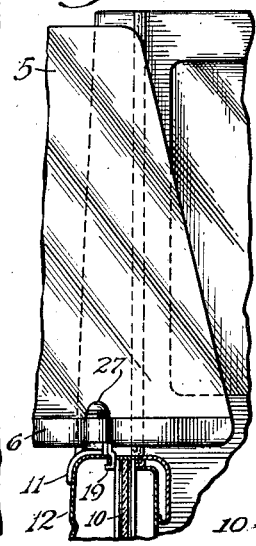
Fig. 5 is an enlarged sectional view taken on line 5—5 of Fig. 2 with parts omitted.
Figure 6:
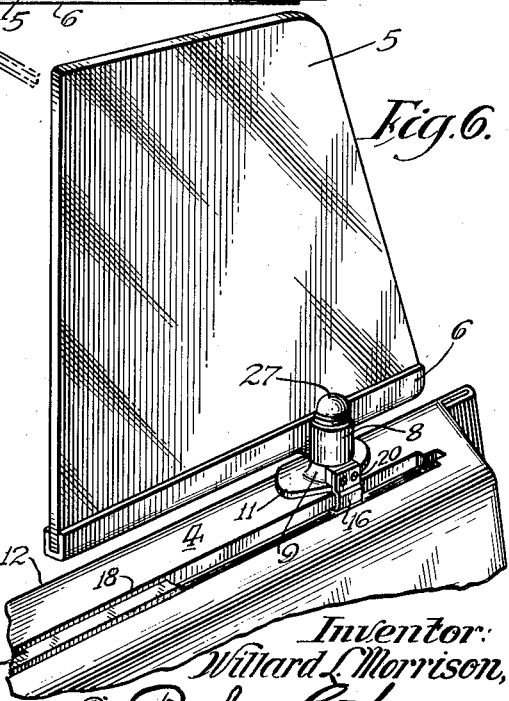
Fig. 6 is a perspective view of the deflector and the part to which it is connected.

Referring now to the drawings, in Fig. 1 there is shown an automobile 1 of the convertible type, having the top 2 which can be removed or lowered. The door 3 does not extend up to the top, the upper part of the door being shown at 4. Connected with the door is a deflector comprising the glass 5 with a holding member 6 attached to the bottom thereof. A pivot 7 is connected with this holding member 6.

As herein shown the holding member 6 has connected therewith a receptacle 8, preferably integral. The pivot 7 passes through this receptacle, there being a hole in the bottom for this purpose, as shown in Fig. 7. This pivot is connected with a supporting member 9 which extends across the portion of the reveal outside of the main sliding window 10 and which has a portion 11 extending downwardly and which is fastened to the portion 12 of the automobile in any desired manner, as by the fastening device 13.

The pivot 7 is fastened to the support 9 in any desired manner, but so that it will not rotate in the support. In the construction shown this attachment is made by providing the pivot with a reduced end portion 14 and welding it to the support 9, the welding being indicated at 15. The support 9 is fastened to the reveal in any desired manner. As herein shown there is a fastening piece 16 the lower end of which fits between the edge of the window opening and the bent portion 18 of the reveal, the fastening piece having a bent portion 19 which projects under the bent portion 18. The fastening piece is connected to the support 9 by the fastening devices 20.

The pivot 7 is arranged so that the pivotal motion of the glass 5 is resisted and so that the glass 5 will be held in any position to which it is moved. In the construction shown this is accomplished by providing in the receptacle 8 a spring 21 which engages the bottom of the receptacle, there preferably being a friction washer 22 between it and the bottom. A top piece 23 fits into the receptacle on top of the spring, there being preferably a friction washer 24 between the spring and the top piece. The pivot 7 is threaded and there is a nut 25 on the threaded end which, when tightened, presses the top piece 23 downwardly so as to compress the spring 21 in order to cause it to tightly press the friction washers. The nut 25 is preferably provided with a locking means 26 which prevents it from becoming accidentally loosened. The nut and the upper end of the pivot is preferably covered by a cap 27. There is a spring member 28 under the nut which engages a recess 29 in the cap so as to hold the cap in position.

In Figures 14 to 17 I have shown a modified construction. In this construction the fastening piece 16 is omitted and the supporting member 9 is connected with the reveal by suitable fastening devices. As herein shown the supporting member 9 is provided with screw holes 17a into which screws 17 pass, the screws entering the reveal. The part 11 of the supporting member has a screw hole 13a through which the screw 13 passes. When the reveal is made of metal small holes will be made therein and then the metal punched in so as to form a sleeve construction, as clearly shown in Figs. 7 and 15, and the screws when screwed in form threads on the sleeve so as to hold the parts in position. When there is any wood associated with the reveals the screws enter the wood.

The use and operation of my invention are as follows:

The deflector is assembled preferably at the factory and may be applied to any automobile. It is particularly adapted for a convertible automobile. In applying the deflector the support 9 is placed in position on the lower reveal, as shown in Fig. 7, and the fastening piece 16 is also placed in position and the fastening devices 13 and 20 applied to hold the parts in position. The nut 25, when the deflector is made up, is screwed down so as to secure the desired resistance to movement of the glass 5, and hence no further attention need be paid to it.

It will be seen that I have here a deflector which has only a single point of attachment at its bottom to the reveal of the automobile and that it is within the reveal. It will further be seen that this deflector can be moved to any angular position to secure the result desired.

It will further be seen that this deflector, while it can be used on any automobile, is particularly adapted for a convertible automobile as by being attached only at one point by a single friction pivot. It is not affected by the top of the car, as to whether the top is up or down, and can be used under all conditions. It will further be seen that it can be easily and quickly attached to the reveal and when so attached has a firm connection. It will also be seen that it can be easily and quickly removed if desired.

I claim:

1. A deflector for automobiles comprising a glass, a holding member connected with the lower edge thereof, a single friction pivot connected with said holding member at one side of said glass, and projecting upwardly from the reveal and extending only part way along the glass and means for fastening said pivot on the upper face of the reveal, the single pivot and associated parts supporting and holding the glass in position.

2. A deflector for automobiles comprising a glass, a holding member connected with the lower edge thereof, a single friction vertically extending pivot connected with said holding member at one side of said glass, and projecting upwardly from the reveal and extending only part way along the glass and means for fastening said pivot on the upper face of the reveal, the deflector glass when in its closed position being within the plane of the reveal.

3. A deflector for automobiles comprising a glass, a holding member connected with the bottom of said glass, a receptacle connected with said holding member, a single pivot projecting upwardly from the reveal and extending only part way along the glass and extended through said receptacle having an up and down axis, a supporting member with which said pivot is connected, means for fastening said supporting member to the upper face of the reveal of the automobile, and a friction device associated with said pivot, said single pivot and associated parts acting as the sole support for the deflector.

4. A deflector for automobiles comprising a glass, a holding member connected with the bottom of said glass, a receptacle connected with said holding member, a single pivot projecting upwardly from the reveal and extending only part way along the glass and extended through said receptacle, a supporting member with which said pivot is connected, means for fastening said supporting member to the upper face of the reveal of the automobile, a friction device associated with said pivot, said single pivot and associated parts acting as the sole support for the deflector, said friction device comprising a spring associated with said pivot and enclosed in said receptacle, and a cover for said receptacle, and means for compressing the same to afford resistance to the rocking movement of the glass.

5. A deflector for automobiles comprising a glass, a holding member connected with the lower edge of said glass, a receptacle rigidly connected with said holding member intermediate the front and rear edges of said glass open at the top, a pivot projecting upwardly from the reveal and extending only part way along the glass and extending through said receptacle, a holding member with which said pivot is rigidly connected, means for fastening said holding member to the upper face of the reveal of the automobile, a spring in said receptacle, and means for compressing said spring so as to cause it to frictionally resist the movement of said glass.

6. A deflector for automobiles comprising a glass, a holding member connected with the bottom thereof having a laterally projecting part rigidly connected therewith, and a single pivot projecting upwardly from the reveal and extending only part way along the glass and connected with said projecting part and acting as the sole connecting means between the deflector and the automobile, a supporting member connected with the reveal and having an opening into which the end of said pivot is received.

WILLARD L. MORRISON.